United States Patent [19]

Hannum

[11] Patent Number: 4,810,383

[45] Date of Patent: Mar. 7, 1989

[54] WATER TREATMENT SYSTEM FOR RECTANGULAR CLARIFIERS

[75] Inventor: Joseph B. Hannum, Norristown, Pa.

[73] Assignee: The Budd Company, Troy, Mich.

[21] Appl. No.: 15,817

[22] Filed: Feb. 17, 1987

[51] Int. Cl.⁴ .............................. B01D 21/04
[52] U.S. Cl. ..................... 210/525; 210/526; 210/527
[58] Field of Search .............. 210/242.1, 242.3, 242.4, 210/776, 523, 525, 526, 527, 528, 531, 232

[56] References Cited

U.S. PATENT DOCUMENTS

| | | | |
|---|---|---|---|
| 1,714,739 | 5/1929 | Tark | 210/526 |
| 1,795,143 | 3/1931 | Roddy | 210/526 |
| 1,882,930 | 10/1932 | Roddy | 210/526 |
| 3,313,422 | 5/1967 | Swenson | 210/526 |
| 3,954,619 | 5/1976 | Fry | 210/525 |
| 4,054,520 | 10/1977 | McGivern | 210/525 |
| 4,366,058 | 12/1982 | Wolde-Michael | 210/526 |
| 4,663,042 | 5/1987 | Rasper et al. | 210/526 |

*Primary Examiner*—Benoit Castel
*Attorney, Agent, or Firm*—E. M. Farrell; Herman Foster; T. I. Davenport

[57] ABSTRACT

A clarifier tank for a water and sewage treatment system is provided. A plurality of spaced columns extending along the lengths of the tank include arms extending therefrom to receive rails on which flight members ride. Cables are connected from the ends of the tank to the arms of the columns to maintain the columns stabilized.

14 Claims, 4 Drawing Sheets

WATER TREATMENT SYSTEM FOR RECTANGULAR CLARIFIERS

BACKGROUND OF THE INVENTION

A water and sewage treatment system using a rectangular clarifier is described in a co-pending application Ser. No. 722,047 filed Apr. 11, 1985 entitled "Water Treatment Plastics Products For Rectangular Clarifiers" of Hannum, now U.S. Pat. No. 4,645,598, issued Feb. 24, 1987.

Generally when process water is introduced to a sewage or water treatment plant for treatment solids, both inorganic and organic, are removed from the process water by means of clarification or settling in rectangular clarifiers. These clarifiers are known as primary and secondary clarifiers.

Prior to being introduced into the primary clarifiers, the pocess water receives preliminary treatment to remove large foreign particles or tramp debris; such as stones, wood, rock, glass, etc. The process water then is clarified in the primary clarifiers which allows the remaining solids, both, organic and inorganic, to either settle to the bottom of the tank or rise to the surface of the water for removal by the sludge/scum collector.

The removal of the sludge and scum is accomplished by the travel of a chain and flight collector which moves the sludge settled to the bottom of the clarifier to one end of the tank for eventual removal by a down stream process. The floating scum on the surface of the water is moved to the opposite end of the tank for removal by scum removal equipment. This removal of sludge and scum is generally accomplished in the primary clarifiers. Secondary clarifiers generally remove sludge only.

In recent years, in order to improve the level of treatment in wastewater treatment plants, oxygen has been introduced into the process water. Due to the presence of high levels of oxygen, components, traditionally manufactured of steel have corroded and required frequent replacement. In recent years, the steel components have been replaced by plastic flight members, shoes, stub shafts and the like.

Many clarifier tanks in Europe and the United States are often very wide, in the order of 100 feet. In the United States, when a clarifier is 100 feet wide, it is generally divided into individual bays having widths of 25 feet or less. These individual bays are normally divided by intermediate walls constructed of cast-in-place concrete or cast concrete. With the presence of these intermediate walls the attachment of the chain and flight collector system in each individual bay is accomplished by anchors placed in the intermediate concrete wall. In tanks which do not have intermediate tank walls or in tanks in Europe, and other places which are not subdivided into two bays, collection of the sludge is accomplished by a single steel boom supported by massive above-water framework which requires heavy maintenance and high operating costs.

The installation of chain and flight rectangular sludge removal equipment in tanks that do not have intermediate walls requires a manufacturer to install massive concrete structures.

This invention involves generally dividing a relatively large tank into individual bays without the use or expense of massive concrete structures and to provide the necessary support for return rails on which flight members are disposed to ride.

Plastic elements are preferably used in the rail or wear members in water treatment systems because they are not adversely affected by water or chemicals in the water. At certain times, the tank may be empty and not in use. At such times the rail elements may be exposed to high temperatures from the sun, for example, and tend to expand. It is desirable in these cases to permit the rail elements to expand or contract in accordance with temperature conditions.

OBJECTS OF THE INVENTION

It is an object of this invention to provide an improved water and sewage treatment system in which dividing walls are not required to divide a clarifier tank into individual bays.

It is a further object of this invention to provide an improved water and sewage clarifier tank in which an existing wide tank may be readily divided into a tank with smaller bays without extensive retrofitting.

It is still a further object of this invention to provide a plurality of bays in a clarifier tank with no divider walls or with partial divider walls.

It is still a further object of this invention to provide improved support means for carrying a plurality of flight elements as they move along the length of a tank.

It is still a further object of this invention to provide an improved clarifier tank which does not require extensive structures to break up scum material which has been coagulated at the top of water of the tank.

It is still a further object of this invention to provide improved rail elements for carrying the flight members.

BRIEF SUMMARY OF THE INVENTION

In accordance with the present invention, a clarifier for a water and sewage treatment system includes a rectangular tank including side walls, end walls, and a floor. A plurality of flight members moved by chains are sub-divided into groups and each group is disposed to move on a pair of rails along the length of the tank to skim the surface of the water in the tank to remove scum and to be moved along the floor of the tank to remove sludge. No scum removal is normally used in a secondary clarifier. A plurality of columns are spaced along the length of the tank and secured to the floor. Arms extend from the columns which are adapted to receive rails upon which the flight members ride. The columns are held tightly in position by support cables which are secured at the ends of the tank and connected to the arms of the columns to maintain the columns stable during operation.

Other objects and advantages of the present invention will be apparent and suggest themselves to those skilled in the art, from a reading of the following specifications and claims, taken in connection with the accompanying drawings.

DESCRIPTION OF THE INVENTION

Figure 1:
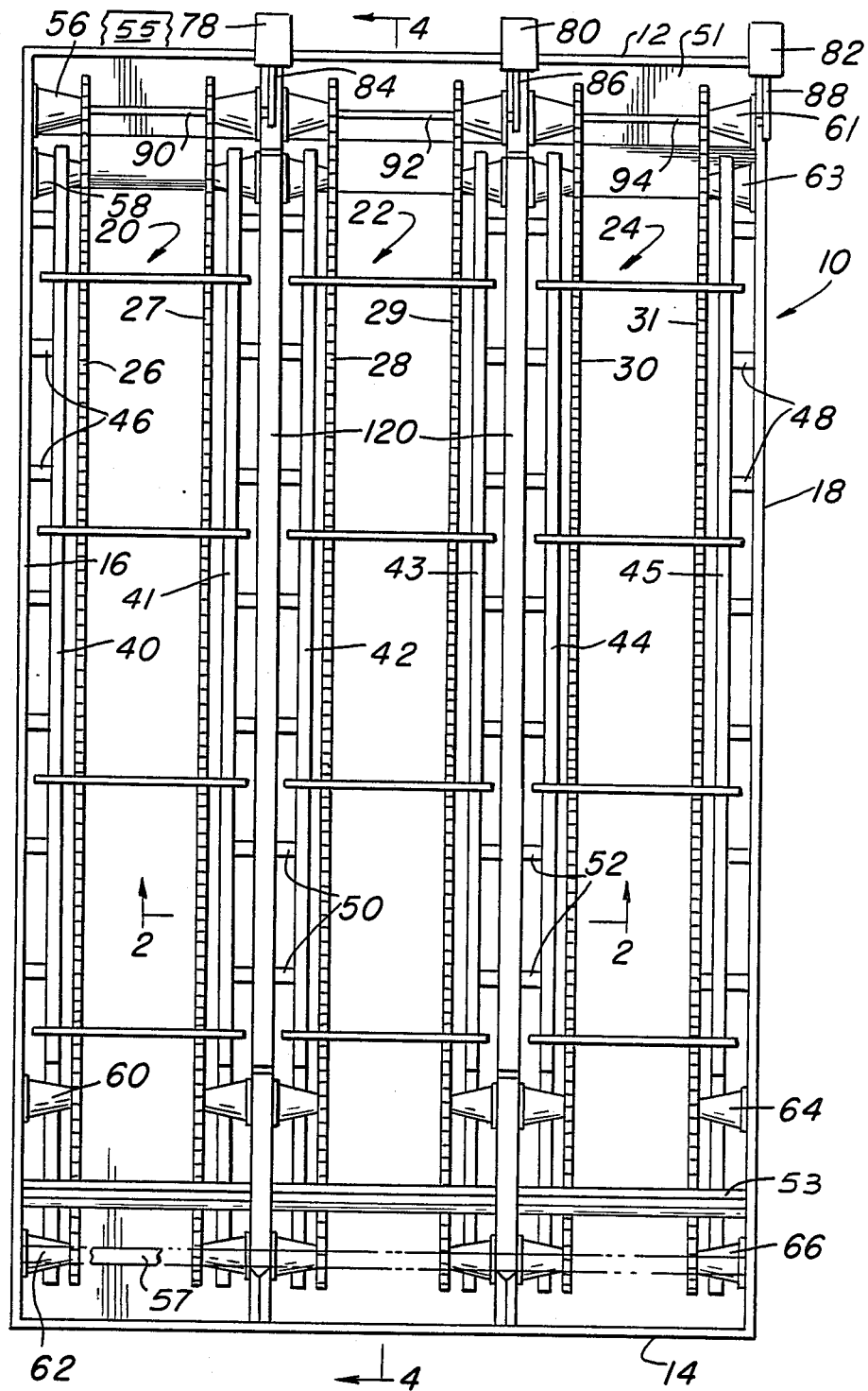
FIG. 1 is a top view of a primary rectangular clarifier system, in accordance with the present invention.
Figure 4:
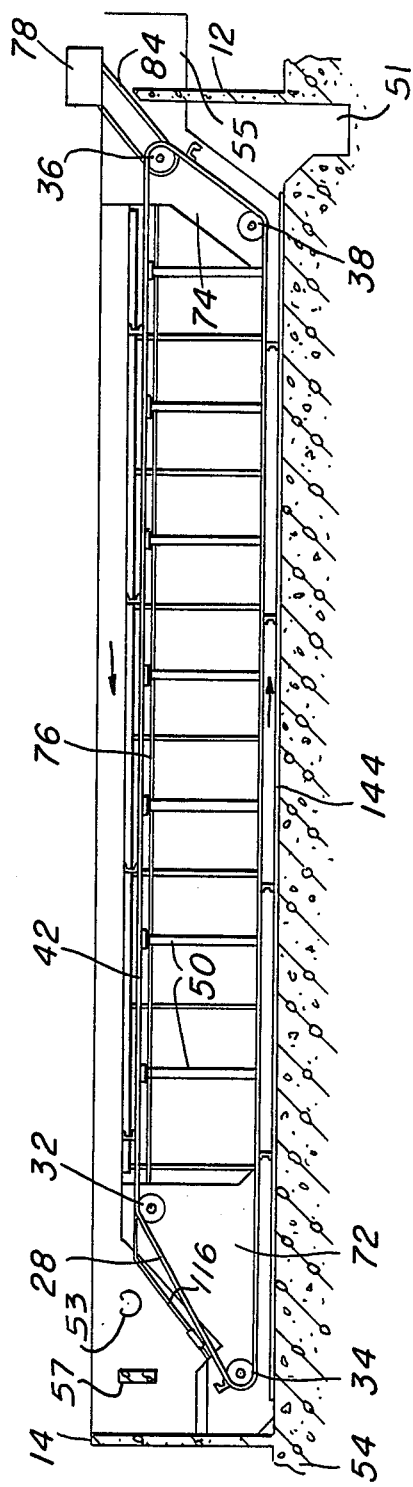
FIG. 4 is a cross-sectional view taken along line 4—4 of FIG. 1.

Referring particularly to FIGS. 1 and 4, a rectangular primary clarifier comprises a tank 10 having end walls 12 and 14, and side walls 16 and 18. The tank 10 is adapted to receive water therein, with chemicals being added for treating water, sewage or the like. A water level is illustrated in FIG. 4. An inlet through 55 is illustrated. While the tank 10 may take various forms and be of different sizes one embodiment of the invention may involve a 300 foot long by 100 foot wide tank. Previous systems involving relatively wide tanks have generally included vertical walls to divide the tank into smaller bays so that the flight members used in the tank would not have to be too long.

A plurality of groups of flight members 20, 22 and 24 are adapted to move longitudinally along the tank to skim the top surface of the water in the tank and to be moved along the floor of the tank, as illustrated in FIG. 4 and in the aforementioned patent of Hannum. The flight members 20, 22 and 24 are carried and driven by pairs of chains 26, 27, 28, 29, 30, and 31 respectively.

As illustrated in FIG. 4, the chain 28 is driven by a drive sprocket wheel 36, with sprocket wheels 32, 34 and 38 acting as idlers. Each of the chains 26,27,28,29,30 and 31 include two sprocket wheels at opposite ends to drive or guide the chains.

Each of the groups of flight members 20,22, and 24 are supported by pairs of rail members 40,41; 42, 43, and 44, 45, respectively. The outer most rail members 40 and 45 are connected to the side walls 16 and 18, respectively, by means of suitable connecting structures 46 and 48, respectively. The intermediate rails 41, 42, 43 and 44 are connected to a plurality of spaced support structures 50 and 52, more clearly illustrated in FIGS. 2,3 and 5, to be described.

As illustrated in FIGS. 1 and 4, the various chains 26, 27, 28, 29, 30 and 31 including the groups of flight members 20,22 and 24 attached thereto are moved along the top of the tank to skim the surface of the water in the tank. The chains move to the left in FIG. 4 along the length of the tank skim the water and then move towards the right in the opposite direction along the floor 54 of the tank 10 to remove solid material which dropped to the bottom of the tank.

FIGS. 1 and 4 illustrate a sludge trough or cross collector 51 which collects the sludge deposited on the floor of the tank. A collecting trough or scum collector 53 collects the floatable waste. A water inlet trough 55 receives the water to be treated and a baffle 57 is provided for the upstream water. These are conventional items in many water treatment systems.

Each of the chains 26, 27,28,29,30 and 31 are driven or guided by sprocket wheels located towards the ends of the tank 10. The inner and outermost sprocket wheels which are associated with chains 26 and 31 are close to the side walls 16 and 18 to permit attachment of bearing structures to the sprocket wheels. For example, bearing structures 56 and 58 with bearing structures 60 and 62 support the sprocket wheels for the chain 26 at opposite ends thereof. The sprockets bearing support structures 56 and 60 are disposed toward the top of the tank 10. The sprocket bearing support structures 58 and 62 are disposed towards the bottom of the tank 10. In like manner, bearing structures 61 and 63 with structures 64 and 66 support the sprocket wheels to associate with the chain 31. The structures 61, 63, 64 and 66 are connected to the side wall 18.

The chains 27, 28, 29 and 30 are also driven or guided by sprocket wheels which are supported at both ends of the tank by suitable structures connected to the floor 54. FIG. 4 illustrates such structures 72 and 74.

The structures 72 and 74 are large structures secured to the floor 54 and end walls 12 and 14 of the tank 10. They may be precast and include steel reinforced concrete. FIG. 4 illustrates the bearing structures for the sprocket wheel on chain 28. Similar bearing structures are required to support the sprocket wheels associated with chains 27, 29 and 30. It is understood that all the chains and their respective sprocket wheels are supported and driven in a manner similar to that illustrated in FIG. 4.

FIG. 1 illustrates the means for driving the four drive sprockets for driving or guiding each chain. These means may include drive motors 78, 80 and 82 which are connected to belts or chains 84, 86 and 88, respectively. The chains or belts 84, 86 and 88 are connected to sprockets to drive chains 27, 29, and 31. Shafts 90, 92 and 94 are fixed to the drive sprockets to drive the chains 26, 28 and 30. More or less than three drive means may be employed. Still referring to FIGS. 1 and 4, a plurality of support members 50 are spaced longitudinally along the length of the tank 10. This arrangement illustrates one of the main objects of the present invention which is to eliminate the need for dividing walls or other structures to provide individual bays in a relatively wide tank. With no dividing walls or structures, support means for the rail members which carry the flight members are still provided.

Figure 2:
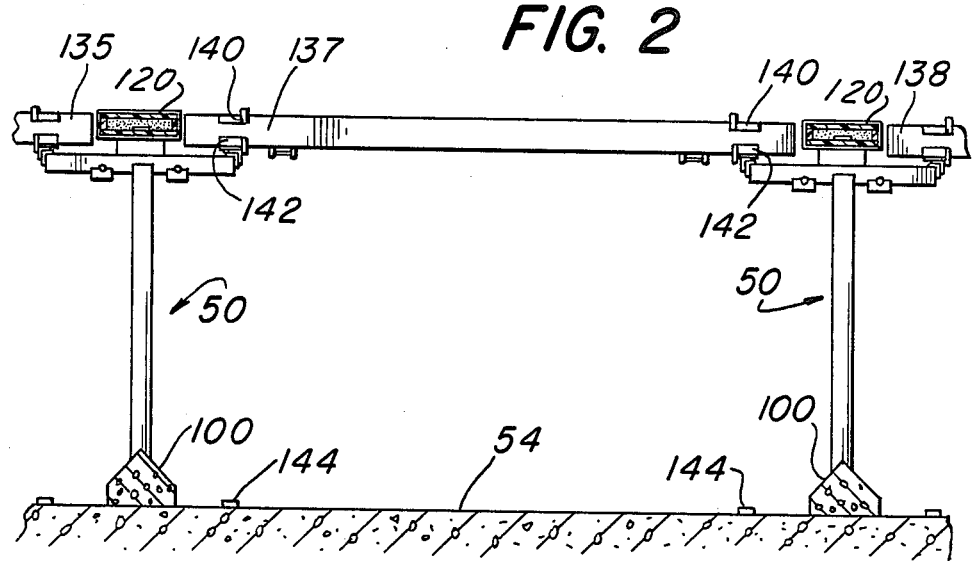
FIG. 2 is a cross-sectional view taken along line 2—2 of FIG. 1.
Figure 3:
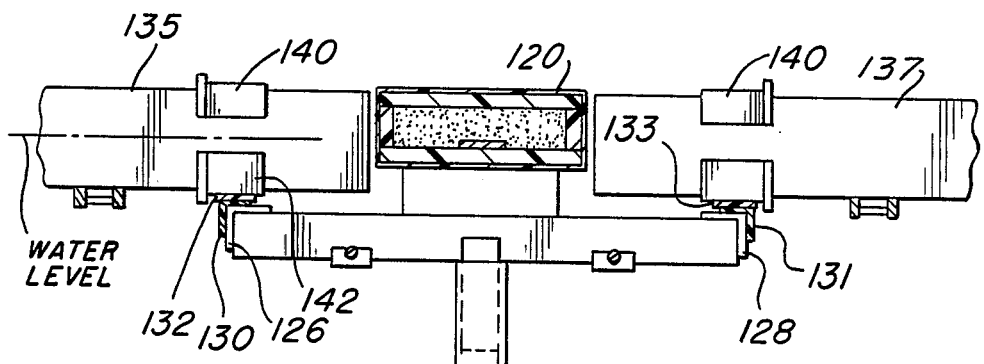
FIG. 3 is an enlarged view of a portion of FIG.2.
Figure 3:
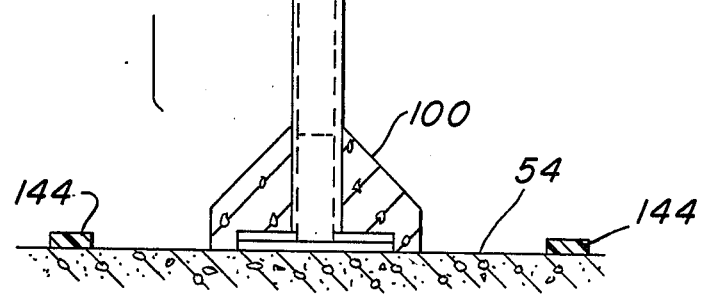
Figure 5:
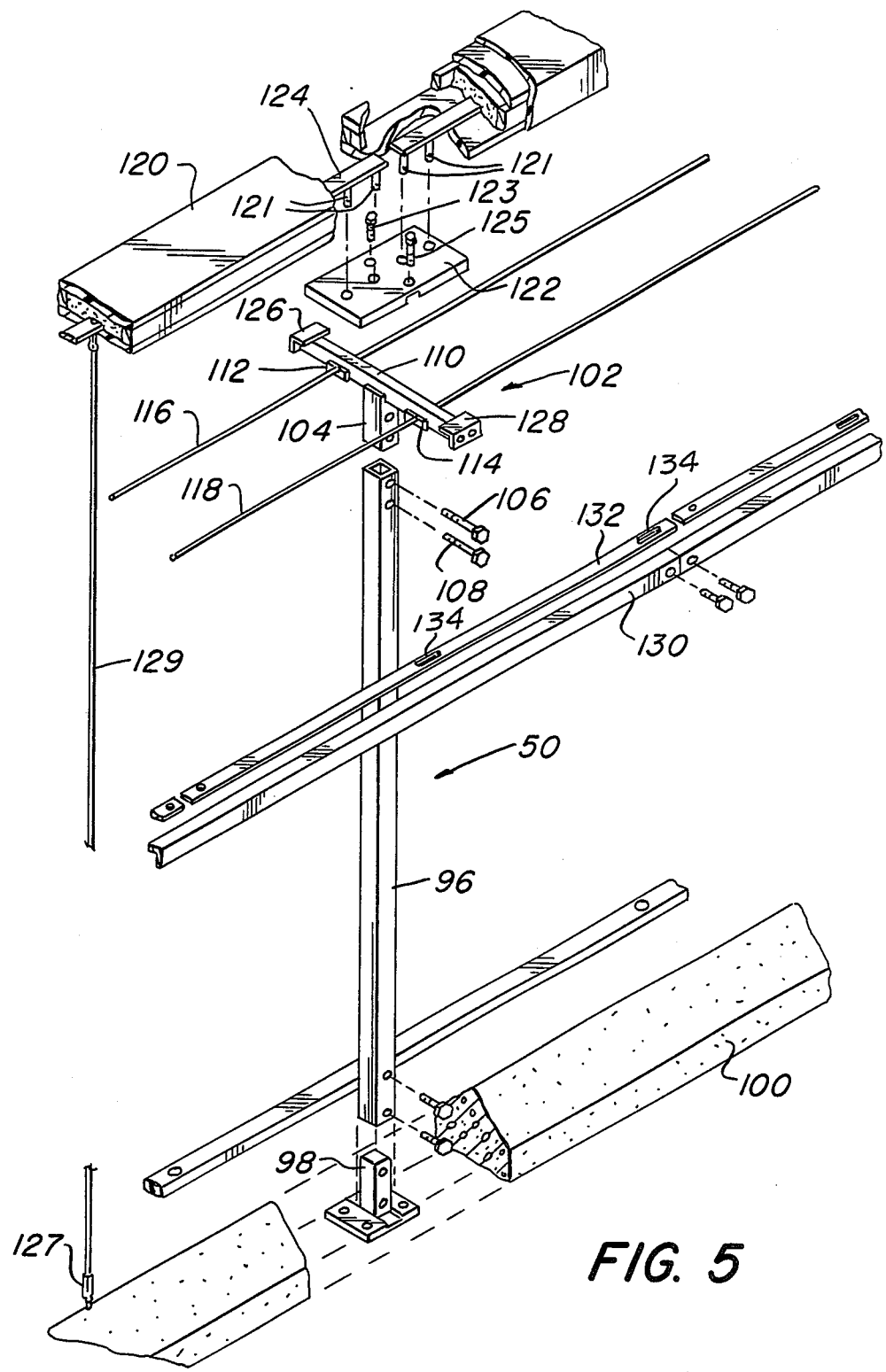
FIG. 5 is an exploded isometric view illustrating a portion of the system, in accordance with the present invention.

Referring to FIGS. 2, 3 and 5 along with FIGS. 1 and 4, one of the support means 50 is illustrated in detail, along with other features of the present invention. Support structure 50 comprises a reinforced column 96, which may be fiberglass reinforced plastic or other suitable material. The column 96 is secured to a column support bracket 98 which is imbedded in a precast concrete separator 100 which is anchored to floor 54 of the tank.

A support bracket assembly 102 is secured to the top of column 96 by any suitable means, such as a connecting element 104 inserted into the top of the column 96 and held in place by means of screws 106 and 108. An arm 110 extends in opposite directions from the column 96 and includes clamp members 112 and 114 secured thereto. The clamps hold cables 116 and 118, which are secured to the end support members 72 and 74 (FIG. 4 illustrates the cable 116 connected to structure 72). The support cables may be made of steel or hard plastic material. While only a single column 50 and associated parts are described it is understood that the description applies to all the columns illustrated.

A feature of the present invention, to be described further, includes the inclusion of a wall or floatable barrier member 120, which acts as a scum barrier between adjacent inner ends of flight members as illustrated in FIGS. 1, 2 and 3. The wall or barrier 120 is secured to the arm 110 through a support plate 122 which is connected to the arm 110 by means of screws 123 and 125. The barrier 120 may be constructed of foam, plastic or other suitable material. A strip 124 extends through the barrier 120 and includes screws 121 which extend through openings in the support plates 122 and held in place by screws (not illustrated).

An anchor cable 129 is connected between the strip 124 and the divider 100. The cable 126 may be made of stainless steel. An eye hook and turnbuckle 127 may be connected to the cable 129 to permit the barrier 120 to be adjusted of proper height. The length of the cable 129 is set in accordance with the height from the floor 54 of the water in the tank 10. In a preferred embodiment of the invention, the scum barrier 120 is designed to be half above the water and half below the surface of the water in the tank 10. The barrier is normally floatable on the water.

The purpose of the so-called scum barrier 120 is to eliminate or minimize the space between the ends of the flight members 135 and 137 (FIGS. 2 and 3), or flight members 137 and 138 (FIG. 2).

As illustrated in FIGS. 1,2 and 3, there is normally space between the ends of the flight members. If the space is too great, the scum between the flight members may not be driven by the flight members. The present invention therefore provides a barrier between the ends of the flight members to prevent any scum between the ends of the flight members from not being removed from the tank 10.

It is noted however, that in some cases the scum barrier may not be needed. For example, if the ends of the flight are relatively close, the scum will tend to coagulate and form a solid material. The solid scum between the ends of the flight members will then normally move along with the flight members and thereby the system will gather all the scum at the top surface of the water. However, the use of the scum barrier, as illustrated, provides the versatility needed and eliminates the space between the ends of the flight members, if the designer of the system feels that barriers are required.

In some cases, means may be provided to break up the solid scum collected between the ends of flight members when no barriers are used. These means may include air jets directed against the solidified scum or could include pointed obstructions in the path of the solid scum to break it up or other suitable means.

With respect to the top rails such as rail 130 illustrated in FIG. 5 on which the flight members ride; they include a plurality of sections of wear strips 132 which may be made of plastic in predetermined lengths, for example 10 feet and provided with elongated openings 134. The elongated openings permit the wear strip elements to expand or contract. Thus when the tank is empty and the strips exposed to high temperatures from the sun, for example, the strips are free to expand and then contract with cooler temperatures. The wear strips are secured to both bottom and top rails.

The present invention has provided a system for use in a primary or secondary clarifier in a water and sewage treatment system in which relatively wide tanks are used without the need for expensive concrete walls to subdivide the tank into bays. As indicated, in the past; such walls or other large structures were used to divide the tank into bays in order to provide the means for connecting the rails upon which the flight members ride. The use of the spaced columns 50 of the present invention has eliminated the need for such expensive concrete walls.

Conventional items in the system include upper shoes 140 and lower shoes 142 to engage top and bottom wear strips 132 and 144 as the flight members move to skim the surface of the water in one direction and move along the floor in the opposite direction.

The ends of the arm 110 include connecting elements 126 and 128 for receiving return rails 130 and 131 thereon (FIG. 3). Plastic wear strips 132 and 133 are attached to each of the flight members which ride on the rails 130 and 131.

As illustrated in FIG. 5, the upper rail strips, such as the rail strip 132, is built in sections, which may be 10 feet long, for example. The strip 132 includes elongated openings 134 which receive screws therein for attachment to the rail 130. If the strip 134 is subjected to temperature variations, the elongated slots or openings 134 permit the strip 131 to expand or contract without distortion. The top and bottom rail wear strips may be built in sections with the slots described.

In practicing the present invention, precast concrete similar to curbing (illustrated as structure 100) may be placed along the bottom of the tank to serve as dividers. Dividers divide the relatively wide tank into narrow bays that can be scanned by relatively narrow groups of flight members. These bays may be in the order of 20 or 25 feet wide. Use of the groups of relatively short flight members eliminates the need for the extremely wide flight members in the order of 100 feet which are cumbersome and expensive.

The support cables, such as the cables 116 and 118 support and stabilize the columns 50 which support the flight members. The cable 129 maintains a datum or height above the bottom surface of the tank for the barrier 120, which may float half in and half out of the water in the tank.

What is claimed is:

1. In a rectangular clarifier tank for a water and sewage treatment system including flight members for moving on rails, a combination comprising:
    (a) a plurality of rows of aligned spaced columns longitudinally extending along the length and width of said tank;
    (b) means including said columns for dividing said tank into a plurality of bays with a group of flight members disposed to ride on rails in each of said bays, said means for dividing said tank comprising said spaced columns and longitudinally extending divider strip members secured to and extending slightly above the floor of said tank;
    (c) support assemblies connected to the tops of said columns and including arm sections extending laterally therefrom to receive said rails thereon:
    (d) end structures disposed at the ends of said tank;
    (e) one or more longitudinally extending cables connected to said end structures in taunt conditions and secured to said support assemblies along the length of said tank to maintain said columns stabilized; and
    (f) one or more longitudinally extending barriers supported on said support assemblies between the ends of said flight members to prevent build-up of scum material therebetween.

2. The invention as set forth in claim 1 wherein sectional wear strips are secured to said rails, said wear strips including elongated slot openings to permit expansion and contraction thereof.

3. The invention as set forth in claim 2 wherein a flexible element is connected between the floor of said tank and said one or more barrier, said flexible element being adjustable to control the distance of said one or more barriers from the floor of said tank.

4. A water and sewage treatment system comprising:

(a) a rectangular tank for receiving water and sewage to be treated including end walls, side walls and a floor;
(b) means for dividing said tank into a plurality of bays;
(c) groups of flight members disposed to be moved on rails along the length of said tank in each of said bays;
(d) groups of spaced longitudinally aligned columns secured to the floor of said tank and extending along the length of said tank;
(e) support assemblies connected to the tops of said aligned columns;
(f) said support assemblies including arm sections extending in opposite directions from said aligned columns;
(g) rail elements disposed on said arm sections to support the ends of two of flight members in two of said groups of flight members;
(h) end support structures secured to said floor toward said end walls of said tank, and
(i) one or more cables secured to said end support structures in taunt conditions and connected to the arm sections on said spaced columns to maintain said columns stabilized.

5. An invention as set forth in claim 4 wherein divider strip structures are securred to said floor between said groups of flight members and include attachment means for said columns.

6. An invention as set forth in claim 5 wherein at least one floatable barrier made of foam material with one elongated strip is disposed between the ends of adjacent groups of flight members at the water level in said tank and a second adjustable cable is connected between said strip structures and the floor of said tank.

7. The invention as set forth in claim 6 wherein said arm sections on said columns support said barrier.

8. In a rectangular clarifier tank for a water and sewage treatment system including flight members for moving on rails, a combination comprising:
(a) a plurality of spaced columns extending along the length of said tank;
(b) said columns including arms extending therefrom to receive said rails for said flight members,
(c) means including said columns for dividing said tank into a plurality of bays in said tank with a group of flight members disposed to ride said rails in each of said bays;
(d) said means for dividing said tank comprising longitudinally extending divider members secured to the floor of said tank;
(e) one or more longitudinally extending foam filled barriers supported on said columns between the ends of said flight members to prevent build-up of scum material therebetween;
(f) an adjustable flexible element connected between the floor of said tank and said one or more barriers to control the distance of said one or more barriers from the floor of said tank;
(g) one or more cables connected towards the ends of said tank to maintain said columns stabilized,
(h) sectional wear strips secured to said rails including elongated slot openings to permit expansion and contraction thereof, and
(i) bearing structures disposed at the opposite ends of said tank to secure the ends of said one or more cables and hold said cables in taunt conditions.

9. A water and sewage treatment system comprising:
(a) a rectangular tank for receiving water and sewage to be treated including end walls, side walls and a floor;
(b) groups of flight members disposed to be moved on rails along the length of said tank in each of said bays;
(c) divider structures secured to said floor for dividing said tank into a plurality of bays and disposed between said groups of flight members;
(d) attachment means on said divider structures;
(e) groups of spaced columns secured to said attachment means of said tank along the length of said tank;
(f) arm members extending from the tops of said columns;
(g) rail elements disposed on said arm members to support the ends of two of flight members in two of said groups of flight members;
(h) bearing structures secured to said floor toward said end walls of said tank;
(i) one or more cables secured to said structures and connected to the arms of said spaced columns;
(j) at least one foam barrier with an elongated strip therein disposed between the ends of adjacent groups of flight members at the water level in said tank;
(k) said barrier being floatable on said water, and
(l) a second cable connected between said strip and the floor of said tank.

10. An invention as set forth in claim 9 wherein adjustment means are provided to control the length of said second cable and the height at which said barrier floats on the water in said tank.

11. An invention as set forth in claim 10 wherein wear strips sections are secured to said rail elements, said wear strips being made of plastic and including elongated slot opening to receive connecting elements thereto and to permit expansion and contraction of said strips.

12. An invention as set forth in claim 11 wherein second rail elements with second wear strips are connected to the floor of said tank to receive said flight elements thereon.

13. An invention as set forth in claim 12 wherein said flight members are connected to chains driven by sprocket wheels and movable in a first direction on said rails along the surface of the water in said tank and movable along said second rails on said floor of said tank in an opposite direction to said first direction.

14. The invention as set forth in claim 13 including clamps to secure said one or more cables to said arm sections.

* * * * *